United States Patent [19]
Slator et al.

[11] 3,744,356
[45] July 10, 1973

[54] PIPE BEVELING APPARATUS

[75] Inventors: Damon T. Slator; Daniel G. Shaw, both of Houston, Tex.

[73] Assignee: Bowen Tools, Inc., Houston, Tex.

[22] Filed: Oct. 12, 1971

[21] Appl. No.: 188,391

[52] U.S. Cl. ................................................ 82/4 C
[51] Int. Cl. .............................................. B23b 3/22
[58] Field of Search ...................................... 82/4 C

[56] References Cited
UNITED STATES PATENTS

| | | | |
|---|---|---|---|
| 3,608,406 | 9/1971 | Paysinger et al. | 82/4 C |
| 3,641,851 | 2/1972 | Gibbs | 82/4 C |
| 3,247,743 | 4/1966 | Frost et al. | 82/4 C |
| 3,630,109 | 12/1971 | MacMichart | 82/4 C |
| 2,699,604 | 1/1955 | Ingwer et al. | 82/4 C |
| 1,029,584 | 6/1912 | Berghausen | 82/4 C |
| 2,842,238 | 7/1958 | Shaw et al. | 82/4 C |

*Primary Examiner*—Harrison L. Hinson
*Attorney*—Pravel, Wilson & Matthews

[57] ABSTRACT

A pipe beveling apparatus which includes a first frame having means to engage the outside of a pipe to secure the apparatus to the pipe; a second frame mounted on the first frame for rotation with respect thereto; and, a support having a beveling tool therewith and a roller mounted on the second frame for rotational movement in continuous engagement with the inside of the pipe as the beveling tool is moved about the pipe to precisely shape the end of such pipe for subsequent use as part of a welding groove.

19 Claims, 8 Drawing Figures

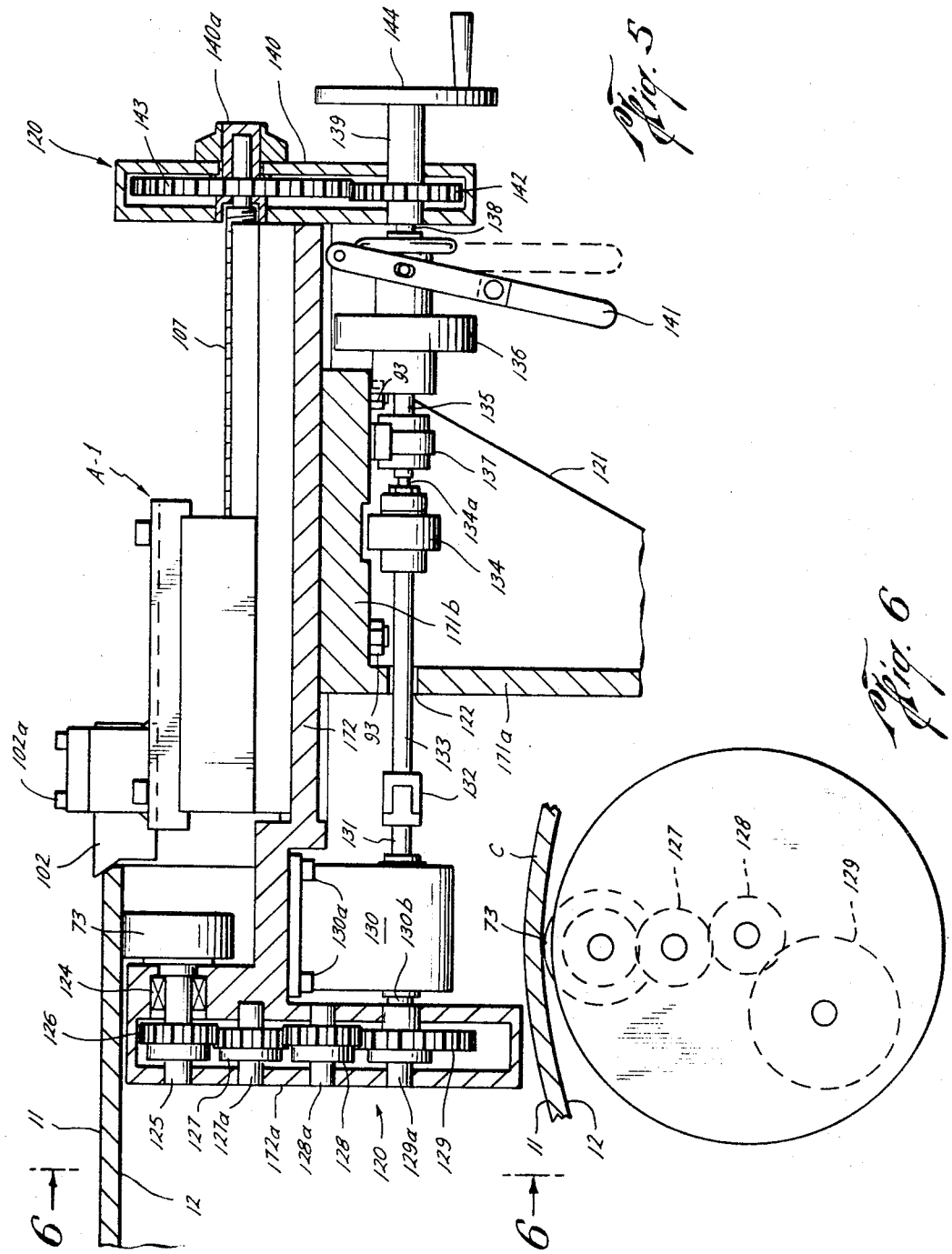

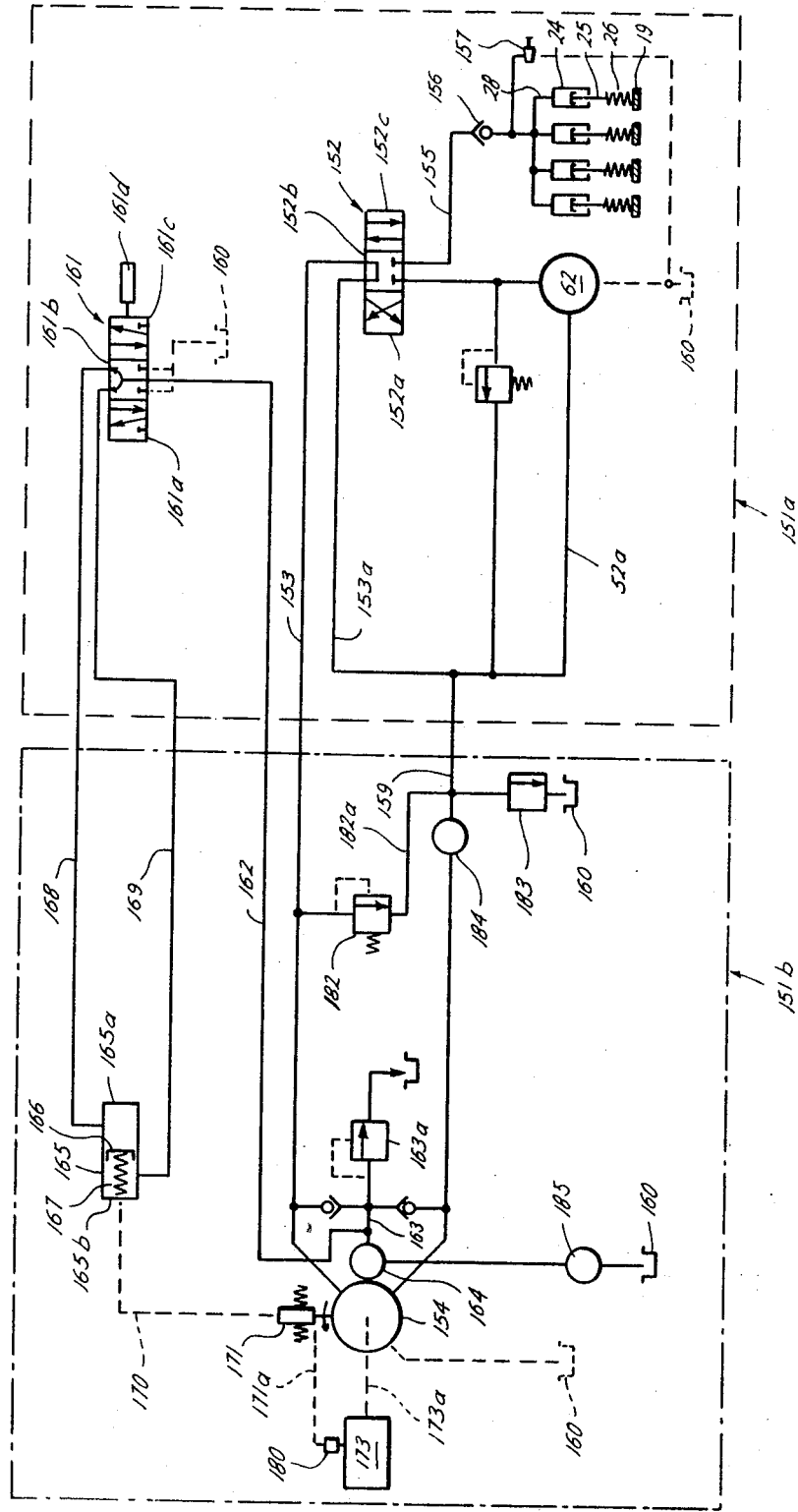

PIPE BEVELING APPARATUS

BACKGROUND OF THE INVENTION

1. Field of the Invention

The field of the invention is apparatus for the beveling of the ends of pipes.

2. Description of the Prior Art

In welding pipe with automatic welding machines, it is important that pipe ends that are to be welded together have substantially identical beveled portions and "lands" or unbeveled radial portions. Such pipe ends are beveled from the outside wall such that the land of each pipe end is adjacent to the inside pipe wall. The thickness of each land is particularly critical since it is the space between and the radial width of such lands which actually form the starting area for the weld; therefore, if the radial width of each land is not of the proper size, defective welds usually results, particularly with automatic welding apparatus since the automatic welding apparatus does not compensate for such defective land widths.

In U. S. Pat. No. 2,769,234, a cutting and beveling tool is pivotally mounted to a support having a guide roller for engaging the outside of the pipe, so that the position of the beveling tool is dependent upon the curvature of such outside pipe surface. Since the thickness of the pipe varies in commercially available pipe, such prior apparatus produced lands of varying widths, depending upon the pipe wall thickness variations, with the attendant deficiencies in the welds when using automatic welding apparatus. So far as is known, no one has heretofore solved such problem.

SUMMARY OF THE INVENTION

The present invention relates to a pipe beveling apparatus which solves the problem of the prior art by producing end surfaces on a pipe which have precisely cut lands of uniform radial width. As a specific embodiment, and not by way of limitation, the apparatus of the present invention is mounted over the pipe end and is secured to the outside of the pipe by means of clamping shoes. A guide roller is mounted for resilient engagement with the inside surface of the pipe for guiding a beveling tool during rotation thereof relative to the pipe end for accurately beveling the pipe end and forming the land with a precise radial width, even though the pipe thickness varies or the pipe is out of round, whereby satisfactory welds can be assured even with automatic welding apparatus.

BRIEF DESCRIPTION OF THE DRAWINGS

FIG. 2A is an enlarged sectional view of a portion of the beveled pipe end formed by the beveling tool;

FIG. 5 illustrates an alternate embodiment of this invention wherein the cutting tool of the beveling means is automatically fed into the pipe end;

FIG. 6 is a schematic view taken along lines 6—6 of FIG. 5 of the gear means of the automatic feed of FIG. 5; and FIG. 7 of the drawings is a schematic view of the hydraulic system used for clamping and driving the pipe beveling apparatus of this invention.

DESCRIPTION OF THE PREFERRED EMBODIMENT

Figure 1:
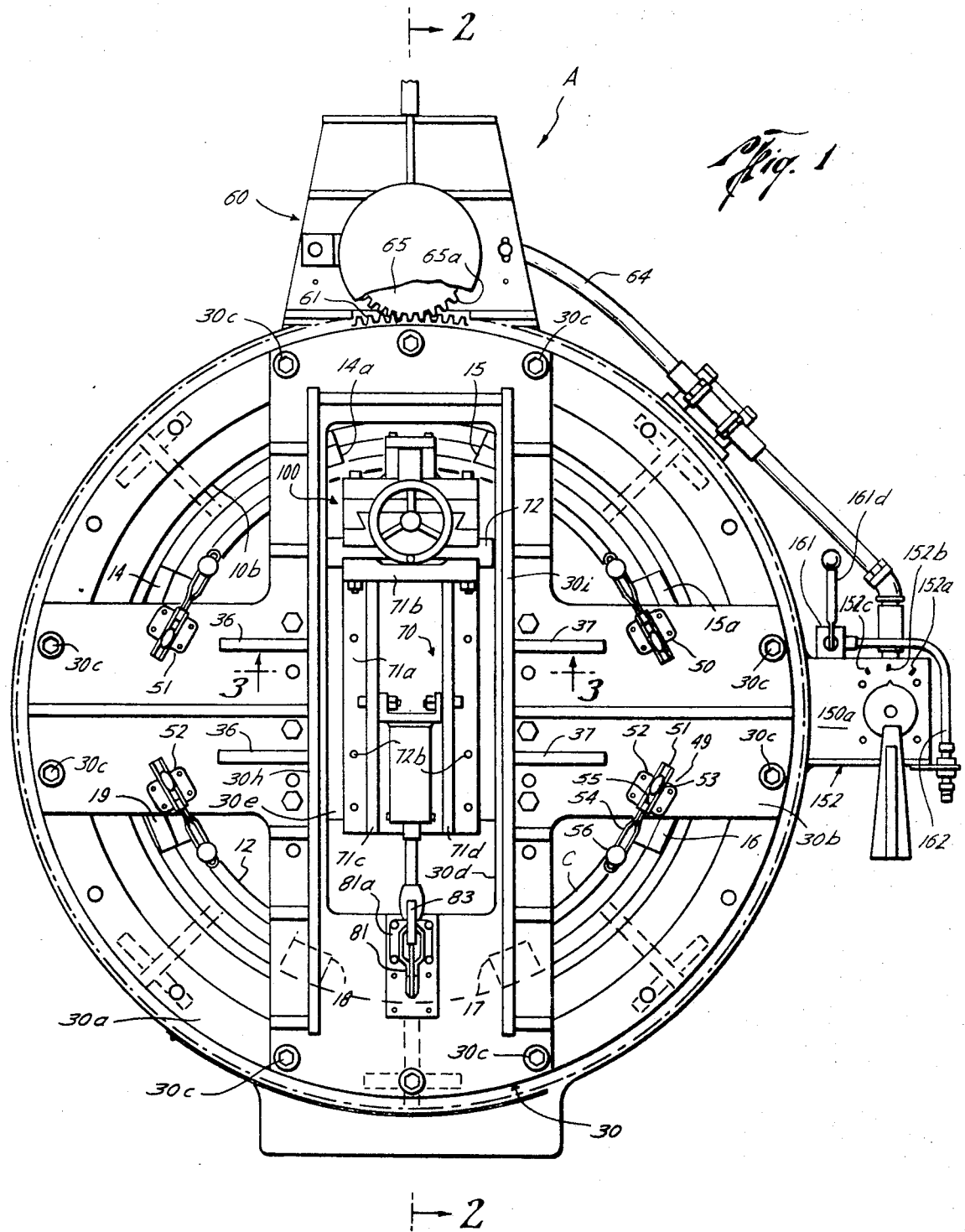
FIG. 1 illustrates in elevation the pipe beveling apparatus of this invention.
Figure 2:
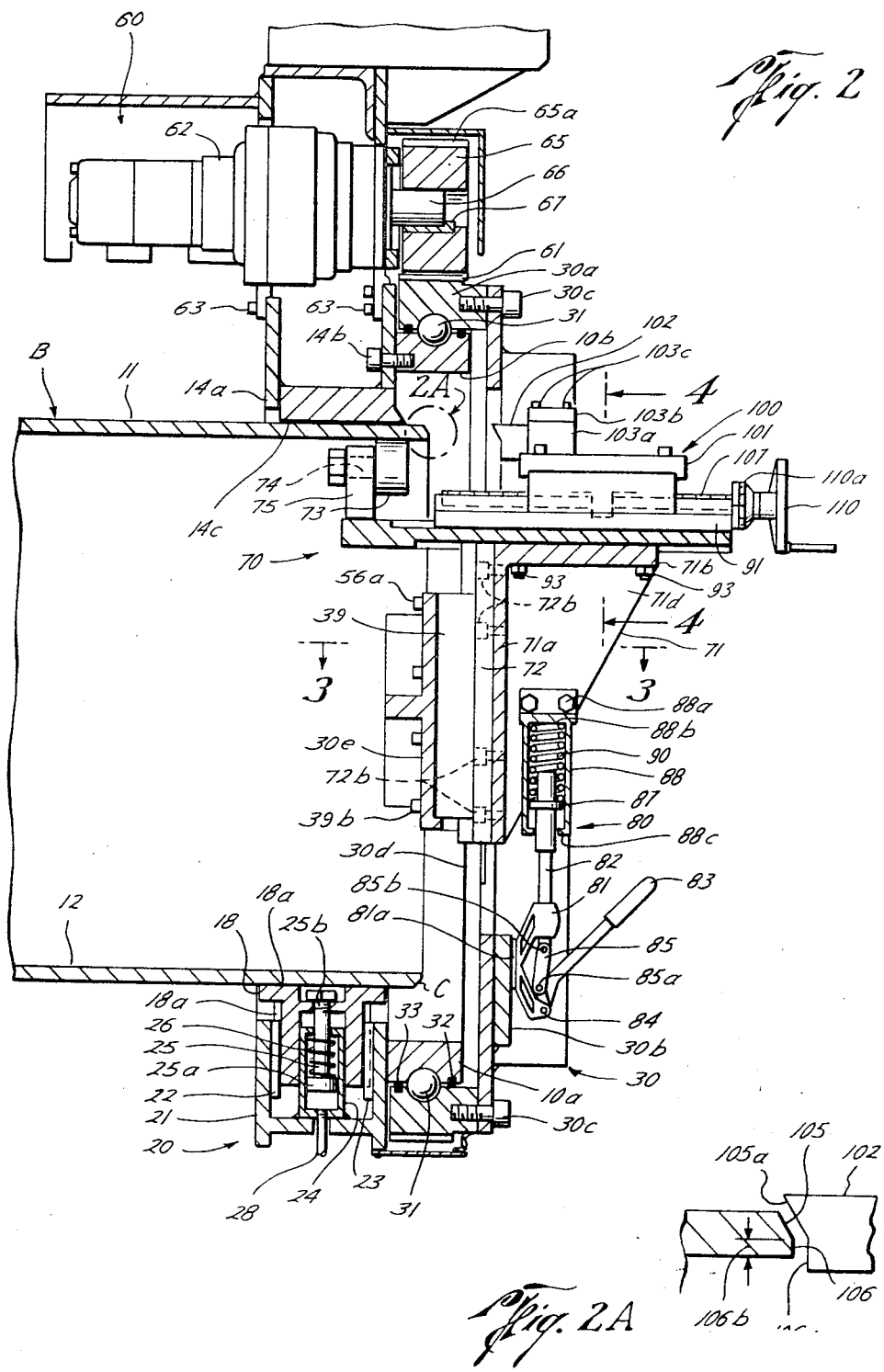
FIG. 2 is a sectional view of the pipe beveling apparatus taken along line 2—2 of FIG. 1.

With reference to FIGS. 1 and 2 of the drawings, the apparatus A of the present invention is illustrated as mounted over a pipe B for accurately beveling the end C of the pipe. Basically, the pipe beveling apparatus A comprises a first frame 10 which includes a solid ring 10a having an aperture 10b with a diameter slightly larger than the diameter of outer pipe wall 11 of the pipe whereby the first frame may be mounted about the outside pipe wall. A second frame 30 is mounted onto the first frame 10 for rotation with respect thereto; and, a rotating means 60 is mounted onto the first frame 10 for rotating the second frame 30 about the pipe B. Positioning means designated generally as 70 are mounted for movement in a radial direction on the second frame 30 for continually engaging the inside surface or wall 12 of the pipe in spite of variations in the thickness or curvature of such inside wall 12. To actually engage and bevel the pipe end B, beveling means 100 are mounted for movement with the positioning means 70, the position of the beveling means on said pipe end varying with movement of the positioning means and thus with variations in the inside pipe wall to accurately bevel the pipe end, as will be more fully explained. An hydraulic power system 150, which is shown in detail in FIG. 6, is preferably provided for driving the rotating means 60 of the pipe beveling apparatus.

To secure the pipe beveling apparatus A to the outside surface or wall 11 of the pipe B, a plurality of fixed shoes 14, 14a, 15 and 15a, preferably four in number, are mounted on the first frame 10 by bolts such as bolt 14b, which mounts the fixed shoe 14a to the solid ring 10a of the first frame 10. The shoes extend radially inwardly from the solid ring into engagement with the outside pipe wall 11. Each of the fixed shoes, such as shoe 14a, has a concave inner surface 14c which substantially conforms to the convex shape of the outer wall 11 of the pipe.

A plurality of adjustable shoes 16, 17, 18 and 19, preferably also four in number, are mounted on the solid ring 10a for radial movement toward and away from the outer pipe wall 11 such that such adjustable shoes cooperate with the fixed shoes 14, 14a, 15 and 15a to secure the first frame 10 to the pipe B, and thus to locate the entire apparatus relative to the pipe. Each of the adjustable shoes, such as adjustable shoe 18, includes a shoe moving means 20 for moving each shoe radially into and out of engagement with the outer pipe surface or wall 11.

The shoe moving means 20 for moving the adjustable shoe 18, which is shown in section in FIG. 2, includes a housing 21 having two keys 22 and 23 extending inwardly into keyways 18a, 18b, respectively, in the adjustable shoe 18 so that the adjustable shoe 18 is mounted for slidable movement within the housing 21. An hydraulic cylinder 24 is welded to the inside of the housing 21 and a piston 25 having piston head 25a is mounted in the hydraulic cylinder 24 for slidable, sealable movement therein. The piston 25 has a threaded portion 25b which is in threaded engagement with a retaining nut 25c to secure the piston 25 to the shoe 18. The piston is preferably spring loaded by a coil spring 26 which is mounted about the piston head 25a in the hydraulic cylinder 27 so that the adjustable shoe 18 is continually urged to a position out of engagement with the outside wall of the pipe.

Thus, when the pipe beveling apparatus has been mounted over the pipe B, the fixed shoes 14, 15, 16 and 17 engage the outer wall of the pipe and, when hydraulic fluid is pumped under pressure through the hydraulic line 28, the piston 25 and the adjustable shoe 18 attached thereto are driven radially inwardly into engagement with the outside pipe surface 11. Preferably, the contact surface 18a of the shoe 18, and the corresponding surfaces (not shown) on the other fixed and movable shoes, are curved substantially to conform with the extended pipe surface 11. The other three adjustable shoes 16, 17 and 19 are preferably mounted as is shoe 18 and they are also forced into clamping engagement with the outer pipe wall 11. One of the advantages of using such combination of fixed and adjustable shoes is that the apparatus A is adapted to be mounted on pipe of various external diameters.

The second frame 30 includes an annular outer race 30a which is positioned concentrically outwardly with respect to the solid ring or inner race 10a of the first frame 10. A plurality of ball bearings 31 are mounted between the inner and outer races. O-ring seals 32 and 33 seal off the area between the inner and outer races where the ball bearings 31 are mounted so that a lubricant can fill this area whereby the second frame 30 is rotatable freely with respect to the first frame 10.

Figure 3:
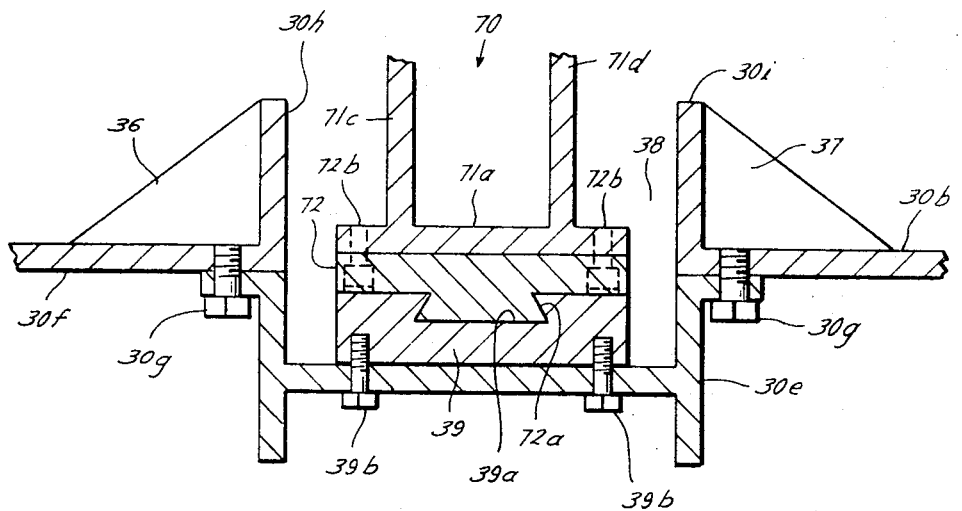
FIG. 3 is a sectional view taken along line 3—3 of FIG. 2 illustrating the mounting of the positioning means on the second frame.

The second frame 30 further includes a cross-brace 30b which is mounted onto the outer race 30a by bolts 30c. An aperture 30d is cut or formed in the cross-brace 30b and a supporting member 30e (FIGS. 1 and 3) is mounted onto the back wall 30f of the cross-brace by means of bolts 30g (FIG. 3). The cross-brace 30b may include a number of supporting gussets such as gussets 36 and 37. The supporting member 30e mounted on the cross-brace 30b across the aperture 30d cooperates with walls 30h and 30i of the cross-brace to form a U-shaped channel 38. A guide member 39 having a dovetailed groove 39a is secured by bolts such as 39b to the support member 30e to mount the positioning means 70 for slidable movement.

For initially positioning the apparatus A about the pipe B, stop members 49, 50, 51 and 52 are provided to accurately and quickly position the first frame 10 the proper distance from the pipe end C so that the outer annular race 30a and the cross-brace 30b of the second frame are in position to rotate about the pipe end, as will be more fully explained. The stop members 49–52 are mounted on the cross-brace 30b and extend from the cross-brace to engage the pipe end.

Each stop member such as stop member 49 includes a bracket 51 mounted to a base plate 52 on the cross-brace 30b by a fastener post or bolt 53. A U-shaped holding finger 54 is pivotally mounted in the bracket 51 by a pin 55 or other suitable means; and, a grommet or contact member 56 of rubber or other suitable material is inserted in, or is otherwise attached to, the finger 55 to engage th pipe edge C to limit the movement of the apparatus inwardly from such edge along the pipe. The finger 54 of each of the stop members 49–52 is pivoted outwardly out of engagement with the pipe edge C to a position substantially perpendicular thereto, after the clamping shoes 16, 17, 18 and 19 have been engaged with the pipe to secure the apparatus to the pipe.

The rotating means 60 is mounted on the first frame 10 for rotating the second frame 30 about the pipe B. The frame 30 has a ring gear or rack 61 machined on the outside of the outer ring 30a. A hydraulic motor 62 is mounted on the first frame by any suitable means such as bolt 63. Hydraulic fluid under pressure is supplied to the hydraulic motor 62 through an hydraulic line 64 from an hydraulic power system of any suitable type, an example of which will be described in detail hereinafter. A pinion 65 is mounted onto hydraulic motor shaft 66 with a key 67 such that gear teeth 65a of the pinion 65 engage the ring gear 61 whereby rotation of the pinion 65 causes rotation of the ring gear 61, and the second frame 30 about the pipe B.

The positioning means 70 includes a support member 71 which is L-shaped in the sectional view in FIG. 2. The L-shaped support member includes a vertically extending plate 71a which is integral with or attached to a horizontally extending plate 71b. Gussets 71c and 71d are welded or otherwise attached to the vertical plate 71a and the horizontal plate 71b. A member 72 having dovetailed guiding slide 72a is mounted onto the vertically extending plate 71a by means of counter-sunk mounting screws 72b and fits into the dovetailed groove 39a in the guide member 39 whereby the L-shaped support member 71 is mounted for slidable movement radially with respect to the pipe B.

Figure 4:
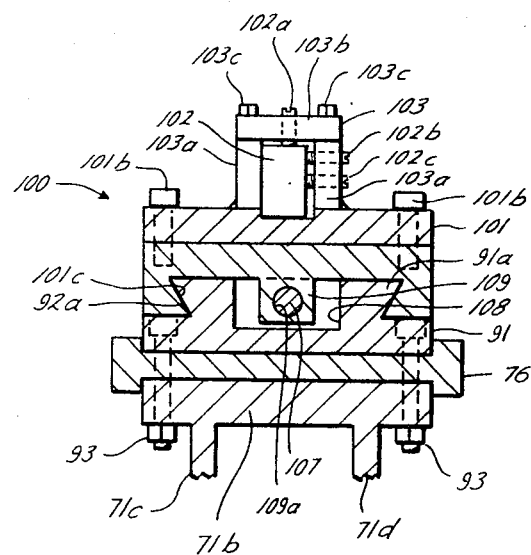
FIG. 4 is a sectional view taken along line 4—4 of FIG. 2 showing the mounting of the beveling means on the positioning means.

A roller support plate 76 (FIGS. 2 and 4) is mounted onto the horizontal plate 71b, as will be explained. A roller 73 for engaging the inside pipe wall 12 is mounted for rotation by means of a shaft 74 which extends through a supporting block 75 attached to the roller support plate 76 (FIG. 2).

A clamping means 80 is mounted onto the L-shaped support member 71 and also to the cross-brace 30b for moving the roller 73 into a clamped position in engagement with the inside pipe wall, which is illustrated in FIGS. 1 and 2, and to a retraced position out of engagement with the inside pipe wall so that the roller 73 does not contact the pipe when the apparatus is removed from the pipe B. The clamping means 80 includes a supporting bracket 81 which is mounted on the cross-brace 30b by plate 81a. The bracket 81 supports a rod 82 for slidable movement. The rod 82 is moved by means of a handle 83 which is pivotally connected to the bracket 81 by the pin 84 and pivotally connected to a toggle link 85, by the pin 85a. The toggle link 85 is pivotally attached to the rod 82 by pin 85b whereby movement of the handle 83 downwardly from the position shown in FIG. 2 causes the rod 82 to be moved downwardly and, movement of the handle upwardly to the position of FIG. 2 causes the rod 82 to be moved upwardly. Because of the toggle link 85, the handle 83 may be moved to position the pin 85a below the pin 84 and off-center (to the left of pin 84 as viewed in FIG. 2) to thereby lock the rod 82 in its down or retracted position until manually moved to the right again. Similarly, as shown in FIG. 2, the pin 85a is off-center to the left of pin 84 when in the raised position of FIG. 2 to lock the rod 82 in the raised position even when the spring 90 is acting downwardly thereon.

A flange 87 mounted onto the upper end of the rod 82 is disposed in a cylindrical housing 88, which is bolted to the gusset 71d by bolts 88a. A coil spring 90 is mounted in compression between the upper end 88b of the cylndrical housing 88 and the flange 87 to resiliently urge the positioning means 70 and the roller 73 in particular upwardly so that the roller 73 is pressed frictionally against the inside pipe wall 12 when the handle 83 is in the upward position of FIG. 2. When the handle 83 is moved downwardly from the operating position of FIG. 2, the flange 87 moves into engagement with a lower stop shoulder 88c, allowing the spring 90 to expand, at which time the handle 83 is only partially down. The roller 73 has not yet been pulled away from contact with the inside pipe surface 12 when the flange 87 contacts the shoulder 88c. Continued downward movement of the handle 83 moves the entire assembly 70 downwardly to pull the roller 73 out of contact with the inside pipe surface 12, and such downward movement of the handle 83 may be continued until it is off-center and locked open, as previously explained. It should be further noted that the flange 87 is located above the stop 88c when the handle 83 is in the upper or operating position (FIG. 2). Such arrangement permits the roller to move either radially inwardly or outwardly within the limits of such construction, becasue as the roller 73 moves outwardly, the spring 90 is relaxed somewhat and as the roller 73 moves inwardly, the spring 90 is further compressed, but at all times, the spring 90 acts to apply a resilient outward radial force to hold the roller 73 in contact with the inside surface 12 until the handle 83 is moved to the down or retracted position.

A horizontal guide member 91 (FIGS. 2 and 4) having a dovetailed slide 91a is mounted on the roller support plate 76 by the nut and bolt combination 93. The beveling means 100 is slidably mounted on the horizontal guide member 91 for slidable movement axially or parallel to the central axis of the pipe and relative to the end of the pipe. The beveling means includes a tool mounting block 101 having a grooved member 101a mounted thereon by means of bolts 101b; the grooved member 101a has a dovetailed groove 101c which slidably mounts on the horizontal guide member 91 such that the cutting block is slidable with respect thereto.

A cutting or beveling tool 102 is mounted in a holder 103, which has side plate 103a welded or otherwise affixed onto the top of the cutting block 101 and a top plate 103b secured thereto by bolts 103c. Adjustable holding tool screws 102a, 102b and 102c provide for a releasable mounting of the cutting tool 102 within the housing 103 and for the adjustment of the cutting tool with respect thereto. Referring to FIG. 2A, the cutting tool 102 is shown schematically in broken lines adjacent a portion of the pipe end C to illustrate how the beveled portion 105 of the pipe end C is machined or cut by a corresponding beveled surface 105a on the tool and similarly, how the unbeveled raidal portion or land 106 is cut by the vertical or straight surface of the cutting tool 106a.

The cutting tool 102 is moved or fed into engagement with the pipe end C by any suitable feed means such as a threaded feed screw shaft 107 which extends through a slot 108 in the dovetailed stud 91a in the horizontal guide member 91 and is mounted for rotation with respect thereto. A nut 109 having a threaded hole 109a therethrough is attached to and engages threads on the feed screw shaft 107 whereby rotation of the feed screw shaft 107 causes movement of the cutting block 101 and the cutting tool 102 mounted thereon relative to the guide member 91 and the structure therewith. A rotatable operating handle 110 is fixedly attached to the shaft 107 in the usual manner, with suitable calibrations 110a thereon, whereby an operator may rotate the shaft 107, both clockwise and counter-clock-wise, to move the cutting tool 102 into and out of engagement with the pipe end and to adjust the amount of each cut by the tool 102 for each rotation thereof relative to the pipe B.

The pipe beveling apparatus A of FIGS. 1–4 operates in the following manner. With the handle 83 in the down or locked open position so as to hold the roller 73 down in its lowermost position, the first frame 10 is mounted over the pipe and pushed along the pipe until the stop members 49, 50, 51 and 52 which are in the position of FIG. 1, engage the pipe edge C. In this position the fixed shoes 14, 14a, 15 and 15a rest upon and thereby engage the upper part of the outside wall 11 of the pipe. The adjustable shoes 16, 17, 18 and 19 are then moved into engagement with the lower part of the outer pipe surface or wall 11 by actuation of any suitable means such as the hydraulic power circuit, which will be described hereinafter, such that the entire apparatus A is secured to the pipe. The handle 83 is then moved upwardly to the closed operating position of FIGS. 1 and 2 so that the roller 73 is moved into resilient engagement with the inside pipe wall or surface 12. The operating handle 110 is rotated to move the cutting tool 102 into engagement with the pipe end and the motor 62 is actuated. The motor 62 through the pinion 65 drives the ring 61 and the second frame 30 with the cross-brace 30b about the pipe end such that the cutting tool cuts a bevel and land into the pipe end. Of course, the actual beveling of the pipe end occurs over a number of complete revolutions of the cutting tool about the pipe end; therefore, after each revolution or so, it is necessary for the operator to turn the operating handle 110 a predetermined amount to increase the cutting action by the tool 102 as it rotates in engagement with the pipe end. The radial position of the cutting tool 102 on the pipe edge C is determined by the position of the roller 73 as the roller 73 moves around the inside pipe wall in continuous engagement with the wall. Thus, even though the inside radius of the pipe varies, i.e. the pipe is out of round, or there are other variations in the inside surface 12 or the thickness of the pipe wall, the relationship between the roller 73 and the cutting tool 102 remains fixed with respect to the surface 12 and to each other so as to produce a beveled pipe edge having a land 106 (FIG. 2A) of a uniform radial width or thickness 106b throughout the full circumference of the pipe. The uniform radial width 106b of the land 106 is extremely important when welds are made using automatic welding apparatus because the success of such apparatus requires uniform land widths on adjacent pipe ends. With manual welding, an operator can manually compensate for irregular land widths if he is expert enough to do this, but this is not possible with known automatic welding apparatus. The present invention thus makes it possible to weld pipe using automatic welding apparatus, and of course it also eliminates the necessity for the skill required to compensate for non-uniform lands if welding manually. Furthermore, without changing or adjusting the apparatus, the lands on pipe having different wall thickness may be cut because the cut with the tool 102 is referenced from the inside wall of the pipe. Thus, the inside roller 73 is in contact with the inside wall of the pipe to serve as the reference plane for the cutting tool 102, whereby the radial width 106b of the land on pipes of different wall thicknesses will be the same, although the length of the bevel will of course be greater on the thicker wall pipe.

A further important feature of the present invention resides in the retention of the tool 102 in cutting engagement with the pipe end even if it encounters a section of metal of greater hardness during the beveling operation. Such retention of the cutting action occurs because of the relationship of the tool 102 and the roller 73. Thus, as the tool 102 engages harder metal, the inclined surface 105a (FIG. 2A) of the cutting tool 102 would tend to be forced radially outwardly in a vector direction normal to the inclined bevel 105 of the pipe end, but as such force occurs, it also acts to pull the roller 73 radially outwardly with an increased force against the inside surface 12 of the pipe, thereby compensating for, and preventing, any tendency of the tool 102 to be pushed away from the pipe edge C because of the harder metal encountered.

A modified pipe beveling apparatus A-1 with an automatic tool feeding means 120 is illustrated in FIGS. 5 and 6 wherein the cutting tool 102 is fed automatically and continuously into engagement with the pipe edge C as the tool 102 is revolved relative to the pipe. Since the pipe beveling apparatus A-1 is similar to the apparatus A, the numbers and/or letters for the elements in the modified apparatus A-1 which are identical to the elements the apparatus A are the same.

In the pipe beveling apparatus A-1, the L-shaped support member 121 comprises a vertical plate 121a with a hole 122 cut therein and a horizontal plate 121b welded or otherwise attached to the vertical plate. A roller supporting plate 172 is attached to the horizontal plate 171b by bolts and nuts 93 in the same manner as plate 72 is attached to the plate 71 (FIGS. 1 and 4) or by any other suitable means. A gear box housing 172a is suitably attached to the plate 172. The roller 73 is mounted on the shaft 125 for rotation with the shaft, which is mounted in needle bearings 124. A driving spur gear 126 is mounted on the shaft 125 in driving engagement with an idler gear 127 mounted on shaft 127a. The idler gear 127 drives another idler gear 128 mounted for rotation on shaft 128a which in turn drives a reduction gear 129 mounted for rotation with shaft 129a.

A planetary reduction gear box 130 with conventional gears therein is mounted onto the bottom of the roller support horizontal plate 172 by bolts 130a and has an input shaft 130b coupled to the shaft 129a and an output shaft 131 rotating at a reduced speed with respect to the input shaft 130b. The output shaft 131 is coupled by coupling 132 to a shaft 133 which extends through the hole 122 in the vertical plate 122; and, a torque limiting clutch 134 is connected to the shaft 133 in order to prevent injury to the automatic feed system in the event that very hard metal in the pipe end C offers too much resistance for the automatic feed means to operate properly. A clutch input shaft 135 for another clutch 136 is attached to the output shaft 134a from the torque limit clutch 134, with a pillow block bearing 137 mounting the clutch input shaft 135 for rotation. The clutch 136 includes an output shaft 138 which is attached to a shaft 139 journaled in housing 140. The clutch includes a disengaging arm 141 which, when moved to the position shown in the broken lines in FIG. 5, will disengage the clutch 136. A spur gear 142 is mounted on the shaft 139 for rotation with the shaft within the housing 140. The feed screw shaft 107 is journaled into the housing 140 by means of the sleeve 140a. A driven gear 143 is mounted on the shaft 107 for rotation therewith and engages the gear 142 such that rotation of the gear 142 as a result of rotating the roller 73 by its contact with the inside pipe surface 12 during the revolution of the frame 30 (FIG. 1) relative to the pipe, causes rotation of the feed screw shaft 107 in a direction to feed the cutting tool 102 inwardly towards and into engagement with the pipe end C.

With the pipe beveling apparatus A-1 positioned about the pipe, the clutch 136 disengaged, and the roller 73 clamped into engagement with the inside wall 12 of the pipe, an operating handle 144, which is mounted on the shaft 139, is manually rotated to move the cutting tool 102 into initial engagement with the pipe end to be beveled. Thereafter, the clutch handle 141 is moved to the solid line position shown in FIG. 5 so that rotation of the roller 73 on the inside pipe wall 12 as the motor 62 moves the frame 30 around the pipe causes the cutting tool 102 to be continuously fed at a pre-selected rate relatively towards the pipe end to gradually cut the bevel 105 and land 106 (FIG. 2A) without any further hand feeding of the tool 102.

The hydraulic power system 150 for driving the hydraulic motor 62 and providing hydraulic fluid under pressure for moving the adjustable shoes 16, 17, 18 and 19 into engagement with the outer pipe wall is illustrated schematically in FIG. 7 where the portion of the hydraulic system actually attached to the pipe beveling apparatus A or A-1 is shown within the dash lines 151a and the portion of the system located remotely from the apparatus A or A-1 is shown within the dash-dot lines 151b.

Referring to the portion 151a of the hydraulic system actually attached to the pipe beveling apparatus, which is also partially illustrated in FIG. 1, a four-way operating valve 152 (FIGS. 1 and 7) is supported on the first frame 10 by the welded plate 150a (FIG. 1) and is movable between a "run" position 152a, a "stop" position 152b and a "clamp" position 152c. The operating valve 152 in the clamp position connects incoming line 153 (FIG. 7) from a variable volume hydraulic pump 154 to line 155, which through check valve 156 is connected to the hydraulic lines such as line 28 (FIGS. 2 and 7) for the adjustable shoes so that the valve controls the flow of hydraulic fluid under pressure to the hydraulic cylinders such as hydraulic cylinder 24 for the adjustable shoe 18. The operating valve 152, in the run position connects the incoming line 153 to the hydraulic line 64 leading to the hydraulic motor 62 which drives the roller 73 and cutting tool 102 about the pipe, as previously discussed herein. Hydraulic return lines include line 153a which returns from the operating valve in the stop position 152b and line 52a which returns from the hydraulic motor 62. The return lines are connected to a main return line 159 which is connected to the hydraulic pump 154. Other return lines return directly to a hydraulic fluid supply tank 160.

A volume control valve 161 is also supported on the plate 150a of the apparatus and moveable between a "fast" position 161a, a "slow" position 161b, and a "stop" position 161c to control the speed of rotation of the second frame 30 about the pipe and thus the speed at which the cutting tool 102 travels about the pipe end. In order for the volume control valve 161 to control the speed of the hydraulic motor 62, a hydraulic fluid supply line 162 is connected to the valve and to a line 163, which is the output line of a replenishing pump 164. The hydraulic line 162 continually provides hydraulic fluid under pressure from the replenishing pump 164 to the volume control valve 161. The replenishing pump also provides hydraulic fluid to return or suction line 159 of the variable volume pump 154. If the pressure of the fluid in line 163 of the replenishing pump exceeds a predetermined value, the fluid is exhausted through a relief valve 163a thereby preventing the pressure in return line 159 from exceeding maximum value.

A double-acting hydraulic cylinder 165 has a piston 166 sealably, slidably mounted therein; the piston is spring loaded by the spring 167 mounted therein. The double-acting cylinder 165 is in fluid communication with the volume control valve 161 by means of the line 168 which is attached to the volume control valve 161 and cylinder side 165a. Hydraulic line 169 is attached to the volume control valve 161 and side 165b of the hydraulic cylinder 165. The piston 166 is connected through a mechanical linkage 170 to a spring-balanced pivoted pump control lever 171 which controls the volume delivery of the pump 154. The pump control lever 171 is also connected through a mechanical linkage 171a to a throttle 172 on the driving motor 173 to control the speed of such motor 173. The motor 173 drives the pump 154 through the drive linkage 173a.

The volume control valve 161 determines hydraulically the position of the piston 166 which mechanically determines the speed at which the motor 173 drives the variable volume hydraulic pump 154 and thus determines the speed of the hydraulic motor 62. When the control lever 161d (FIG. 1) for the volume control valve 161 is in the stop position 161c, hydraulic fluid under pressure enters line 168 through the side 165a of the double-action cylinder and urges the piston 166 towards the end of the side 165b of the cylinder against the force of spring 167. The positioning of the cylinder 166 toward the end of the side 165b of the cylinder moves the pump volume control lever 171 on the variable volume pump 154 to a stop position through the mechanical linkage 170; and at the same time as the pump control lever 171 is moved to the stop position, the throttle 172 for the motor 173 is moved to the idle speed position.

To drive the hydraulic motor 62 at a slow speed, the volume control lever 161d is moved to the slow position 161b, which is the position of the valve shown in FIG. 7, so that hydraulic fluid under pressure enters into both lines 168 and 169 thereby entering both sides 165a and 165b of the double-acting cylinder 165 to position the piston 166 substantially in the middle of the cylinder 165. The spring 167 is acting to urge the piston 166 to the right, but the area of the piston 166 on the right exposed to the hydraulic fluid pressure is greater than on the left to offset the spring pressure so that the piston 166 is located at the intermediate position for the slow speed. Thus, with the piston 166 about in the middle of the cylinder 165, the pump volume control lever 171 and the throttle 172 are positioned such that the pump 154 is driven at a slow speed, which of course may be pre-set by the setting of the mechanical linkage 170 to a desired value.

To drive the motor 62 at a fast speed, the control lever 161d of the volume pump is moved to the fast position 161a so that the hydraulic fluid flowing through the line 162 enters the line 169 and into the cylinder side 165b thereby moving the piston 166 towards the side 165a and thus positioning the pump volume control lever 171 and the throttle 180 to drive the pump 154 and motor 173 at a fast speed.

After the pipe beveling apparatus A or A-1 has been positioned about the pipe end with the stop elements 56 on the stop members 49, 50, 51 and 52 engaging the pipe end C, the operating valve 152 is moved from the stop position at 152b to the clamp position 152c where hydraulic fluid under pressure from the variable volume pump 154 is passed through the line 153 into the line 155 through the check valve 156 and into the hydraulic lines such as line 28 for the adjustable shoes. The check valve 156 prevents backflow through the line 155. A valve 182 is preferably provided so that when the clamping pressure on the shoes 16–19 reaches 5,000 p.s.i., the pressure is relieved through line 182a back to the pump 154. A relief valve 183 is also provided to dump the fluid at about 200 p.s.i. when switching from the clamp position to the off position. Filters 184 and 185 are also shown in the system. When a pressure of approximately 5000 p.s.i. has been reached, the operating valve 152 is moved to the run position 152a and the check valve 156 maintains this 5000 p.s.i. pressure on the adjustable shoes so that the apparatus A is secured against the outside wall of the pipe throughout the beveling operation.

Once the apparatus A or A-1 is secured to the pipe, the clamp handle 83 is moved upwardly to the position of FIG. 2, thereby moving the roller 73 into resilient engagement with the inside pipe wall 11. With the apparatus A, with the manual tool feed of FIGS. 1–4, rotation of the handle 110 moves the cutting tool 102 into engagement with the pipe end C. When using the apparatus A-1 with the automatic feeding means 120 of FIG. 5–6, the handle 144 is only used to move the cutting tool into initial engagement with the pipe end, as previously explained, and thereafter the feed is automatic and continuous until completed and stopped.

The operating valve 161 is moved by lever 161d to the run position so that hydraulic fluid enters through the hydraulic line 64 to the hydraulic motor 62 to thereby drive the motor 62 and thus rotate the entire frame 30 with the roller 73 and cutting tool 102 about the pipe end. When lining up the tool 102 for either apparatus A or A-1 the motor 62 is preferably operated at the slow speed previously described by putting the lever 161d of the volume control valve 161 to the slow position, thereby causing the motor 172 and variable volume pump 154 to drive the hydraulic motor 62 at the slow speed.

Once the tool has been properly lined up, the volume control valve 161 may be moved to the fast position so that the cutting tool 102 is revolved at a faster rate about the pipe end. When nearing the end of the cut of the bevel and land, the lever 161d may again be returned to the slow speed position 161a for the finishing cut on the pipe edge. After the bevel and land have been completed on the pipe, the volume control valve 161 and the operating valve 152 are moved to the stop positions and then a bleed-off vlave 157 is opened so that the pressure on the adjustable shoes is bled off into the supply tank 160. The bleeding off of the supply pressure on the shoes allows the springs such as the spring 26 mounted in the adjustable shoe 18 to move the adjustable shoes out of contact with the outside wall of the pipe, so that the entire apparatus may then be removed from the pipe. As will be obvious to those skilled in the art, pilot operated check valves may be used for the cylinders 24 in place of the manually controlled valve 157 and check valve 156.

The foregoing disclosure and description of the invention are illustrative and explanatory thereof, and various changes in the size, shape and materials as well as in the details of the illustrated construction may be made without departing from the spirit of the invention.

I claim:
1. Apparatus for accurately forming a bevel and land on a pipe end, comprising:
 a. a first frame adapted to be secured to a pipe;
 b. a second frame mounted on said first frame for rotation with respect thereto and with respect to the pipe and fixed against longitudinal movement relative to said first frame;
 c. rotating means for rotating said second frame relative to said first frame and said pipe;
 d. positioning means mounted for movement with said second frame and adapted to extend into engagement with the inside wall of said pipe as said rotating means rotates said second frame about said pipe;
 e. tool means including a cutting tool mounted on said second frame for rotational movement therewith for engaging and cutting a bevel and land on said pipe end;
 f. tool mounting means for mounting said tool means for longitudinal movement in a longitudinal direction substantially parallel to the axis of the pipe and relative to said positioning means and said second frame for progressively increasing the amount of cutting by said cutting tool; and
 g. means interconnecting said positioning means and said tool means for moving said tool means radially with said positioning means relative to said inside pipe wall whereby the position of said tool means on said pipe end is continuously correlated with said inside pipe wall to accurately form the radial width of the land in said pipe end.

2. The structure set forth in claim 1 including:
 a. said second frame including linearly non-pivotal slidable means mounting said positioning means for linear non-pivotal slidable movement into and out of engagement with said inside pipe wall; and
 b. resilient means urging said positioning means into continuous engagement with said inside pipe wall in spite of variations in the inside curvature or thickness of the pipe.

3. The structure set forth in claim 1 including:
 clamping means attached to said second frame and said positioning means for clamping said positioning means in engagement with said inside pipe wall and for retracting said positioning means out of engagement with said inside pipe wall whereby said apparatus may be removed from said pipe.

4. The structure set forth in claim 1 wherein said positioning means includes:
 a. roller means for rolling engagement with said inside pipe wall; and
 b. resilient means continually urging said roller means into rolling engagement with said inside pipe wall in spite of variations therein.

5. The structure set forth in claim 1 wherein;
 a. said first frame is a solid ring having an aperture with a diameter slightly larger than the outside diameter of said pipe whereby said first frame is mounted about said outside pipe wall.

6. The structure set forth in claim 1 wherein said first frame includes:
 a. a fixed shoe extending into engagement with the outer pipe wall; and
 b. an adjustable shoe mounted with said first frame for movement radially towards and away from said outer pipe wall; and
 c. shoe moving means for moving said adjustable shoe radially into engagement with said outer pipe wall whereby said fixed and adjustable shoes cooperate to secure said first frame to pipes of various diameters.

7. The structure set forth in claim 6, including:
 radial urging means disposed between said adjustable shoe and said shoe moving means for urging said adjustable shoe to a position out of engagement with said pipe.

8. The structure set forth in claim 1 wherein:
 a. said first frame includes an annular inner race;
 b. said second frame includes an annular outer race concentrically disposed outside of said inner race; and
 c. a plurality of bearings engaging both said inner and said outer races to facilitate rotation of said second frame with respect to said first frame.

9. The structure set forth in claim 1, wherein:
 a. said second frame includes a ring gear; and
 b. said rotating means includes:
  i. a motor mounted on said first frame; and
  ii. a pinion mounted onto and driven by said motor, said pinion gear engaging said ring gear whereby rotation of said pinion gear causes rotation of said ring gear and said second frame about said pipe.

10. The structure set forth in claim 1, including:
 stop means mounted on said first frame and extending axially inwardly to locate the said first frame at a predetermined axial position with respect to said pipe end.

11. The structure set forth in claim 1 including:
 mounting means for mounting said tool means for slidable movement into and out of engagement with said pipe end.

12. The structure set forth in claim 1 wherein said tool mounting means includes:
 a. a feed screw shaft having threads thereon mounted for rotation and for longitudinal movement relative to said positioning means; and
 b. a cutting block supporting said cutting tool and threadedly engaging said feed screw shaft whereby rotation of said feed screw shaft causes said cutting tool to move longitudinally into engagement with said pipe end relative to said positioning means and said second frame.

13. The structure set forth in claim 1, wherein:
 said tool mounting means includes automatic feed means connected to said tool means and said positioning means for automatically moving said tool means longitudinally relative to said positioning means into engagement with said pipe end in response to movement of said positioning means about said inside pipe wall.

14. The structure set forth in claim 4 including:
a. feed means mounted on said positioning means for feeding said tool means into engagement with said pipe end; and
b. gear means connected to said roller means and to said feed means whereby rotation of said roller means, in response to a rolling engagement with said pipe wall as said second frame is rotated, causes said tool means to be fed into engagement with said pipe end.

15. The structure set forth in claim 3 including:
resilient means disposed between said clamping means and said positioning means whereby said positioning means is resiliently urged against said pipe wall with said clamping means clamping said positioning means in engagement with said pipe wall.

16. The structure set forth in claim 3 wherein said clamping means includes:
a. a rod mounted on said second frame for slidable movement with respect thereto; and
b. said resilient means is a coil spring positioned in compression on said rod and said positioning means whereby said positioning means is resiliently urged against said inside pipe wall with said positioning means clamped in engagement with said inside pipe wall.

17. The structure set forth in claim 1, including:
a. said positioning means includes a roller support slidably mounted on said second frame for radial movement with respect to said inside pipe wall;
b. a roller mounted on said roller support for rolling engagement with said inside pipe wall; and
c. resilient means disposed between said second frame and said roller support for resiliently urging said roller into engagement with said inside pipe wall as said roller is rotated about said inside pipe wall whereby said roller and support move radially inwardly and outwardly as said roller engages variations in said inside pipe wall.

18. The structure set for claim 17, including:
a. clamping means attached to said second frame and to said roller support for movement between a clamped position in which said roller engages said inside pipe wall and a retracted position in which said roller is out of engagement with said inside pipe wall; and
b. said resilient means includes a spring disposed between said roller support and said clamping means, said spring being movable between a partially compressed position and a compressed position, said clamping means moving said spring to said compressed position with said roller in engagement with said inside pipe wall and said clamping means moving said spring to a partially compressed position before moving said roller out of engagement with said pipe wall.

19. The structure set forth in claim 6, including:
a. hydraulic shoes means for moving said adjustable shoes into engagement with said outside pipe wall;
b. said rotating means includes a hydraulic motor; and
c. hydraulic motor means are provided for driving said hydraulic motor at various speeds.

* * * * *